United States Patent [19]

Ducharme

[11] Patent Number: 5,181,884
[45] Date of Patent: Jan. 26, 1993

[54] VENTILATING DEVICE FOR BASEBOARD HEATER

[76] Inventor: Jean-Louis Ducharme, 671 Cadillac Street, Montreal, Canada, H1N 2T2

[21] Appl. No.: 804,923

[22] Filed: Dec. 11, 1991

[51] Int. Cl.$^5$ ............................................. F24F 7/007
[52] U.S. Cl. ................................. 454/246; 454/288; 454/287
[58] Field of Search ............... 454/241, 243, 246, 249, 454/287, 288, 290; 416/178, 203

[56] References Cited

U.S. PATENT DOCUMENTS

| | | | |
|---|---|---|---|
| 779,414 | 1/1905 | Davidson | 98/30 |
| 1,049,758 | 1/1913 | Nold et al. | 416/178 |
| 1,903,143 | 3/1933 | Shurtleff | 98/38.9 |
| 1,949,993 | 3/1934 | Dahlstrand | 257/137 |
| 1,950,768 | 3/1934 | Anderson | 98/38 |
| 1,982,465 | 11/1934 | Crafton | 261/104 |
| 2,087,436 | 7/1937 | Kirby | 261/102 |
| 2,104,233 | 1/1938 | Leinweber | 416/203 |
| 2,775,432 | 12/1956 | McElgin | 257/137 |
| 2,834,279 | 5/1958 | Thompson | 98/38 |
| 2,903,245 | 8/1959 | Kritzer | 257/133 |
| 3,165,625 | 1/1965 | Potter | 219/369 |
| 3,209,668 | 10/1965 | Haerter | 98/38 |
| 4,002,109 | 1/1977 | Hori et al. | 98/32 |
| 4,754,697 | 7/1988 | Asselbergs | 98/103 |

FOREIGN PATENT DOCUMENTS

| | | | |
|---|---|---|---|
| 587408 | 11/1959 | Canada | 416/178 |
| 741430 | 8/1965 | Canada | |
| 772260 | 11/1967 | Canada | |
| 969590 | 6/1975 | Canada | |
| 1147789 | 6/1983 | Canada | |

Primary Examiner—Henry A. Bennet
Assistant Examiner—William C. Doerrler
Attorney, Agent, or Firm—Pierre Lespérance; Francois Martineau

[57] ABSTRACT

A ventilating device is removably placed on a baseboard heater having a heated air exit along the top front edge thereof. The ventilating device has a marginal slot forwardly extending above the air exit of the heater and has a blower fan sucking air from the marginal slot and expelling it through apertures in the upper front portion of the ventilating device. The front wall of the ventilating device extends below the top of the heater to prevent unheated ambient air from entering the fan. The blower fan is made of drums with end walls having fan blades and with air outlets around the periphery and with shield members around the drums so as to direct the air in the desired direction. The ventilating device is preferably provided with an air filter and a water reservoir and a water supply which may be removably mounted in the housing of the ventilating device.

5 Claims, 6 Drawing Sheets

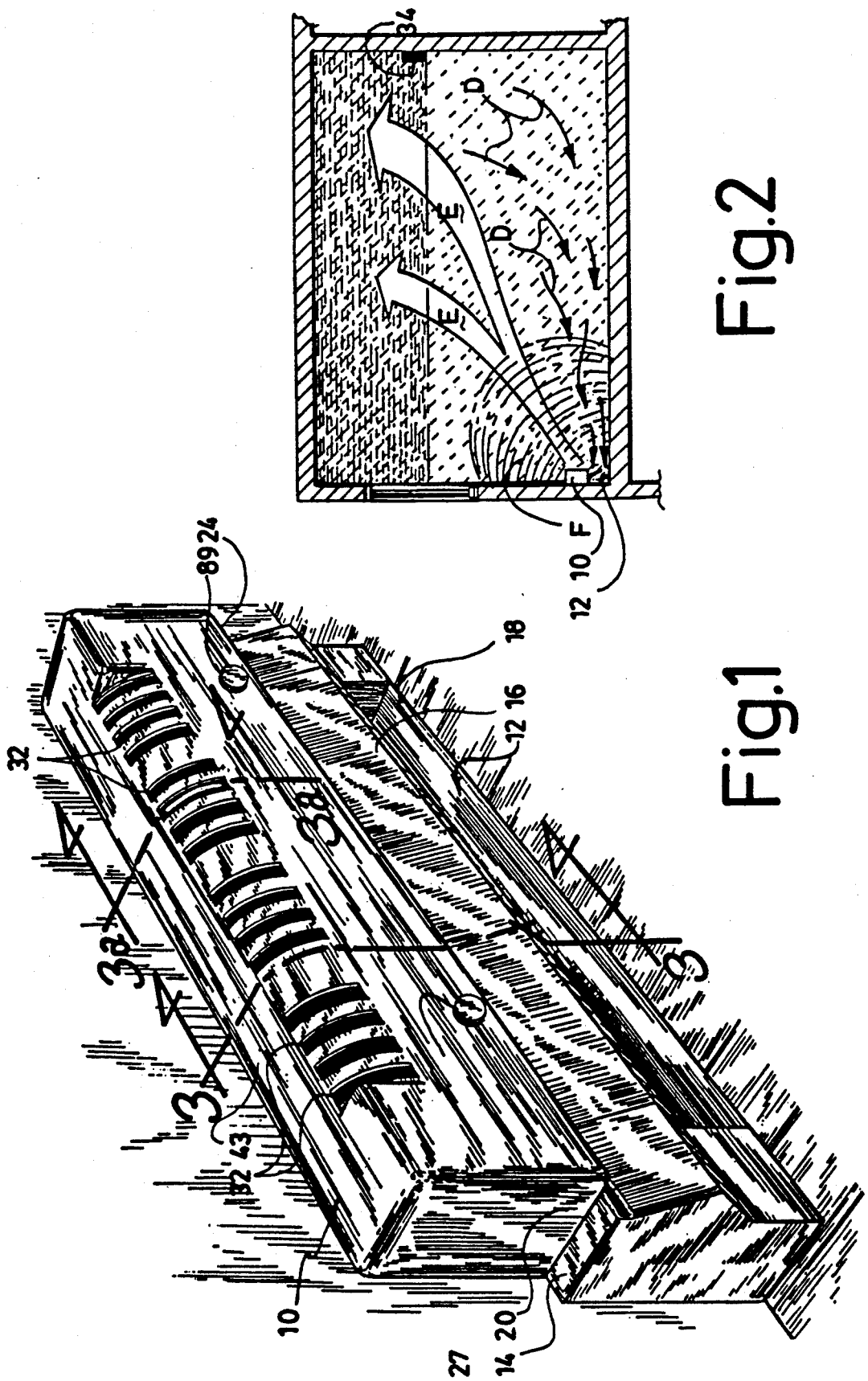

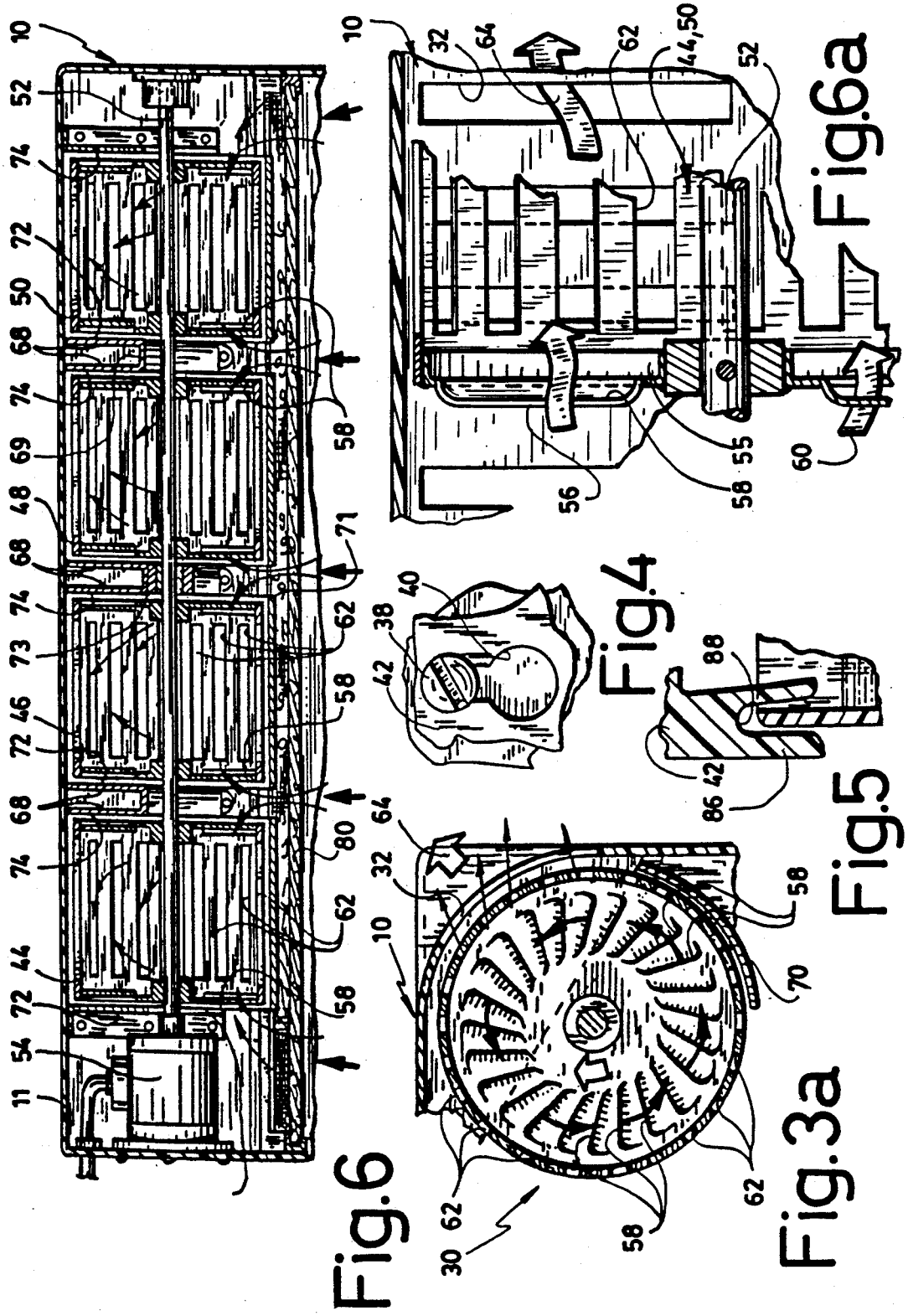

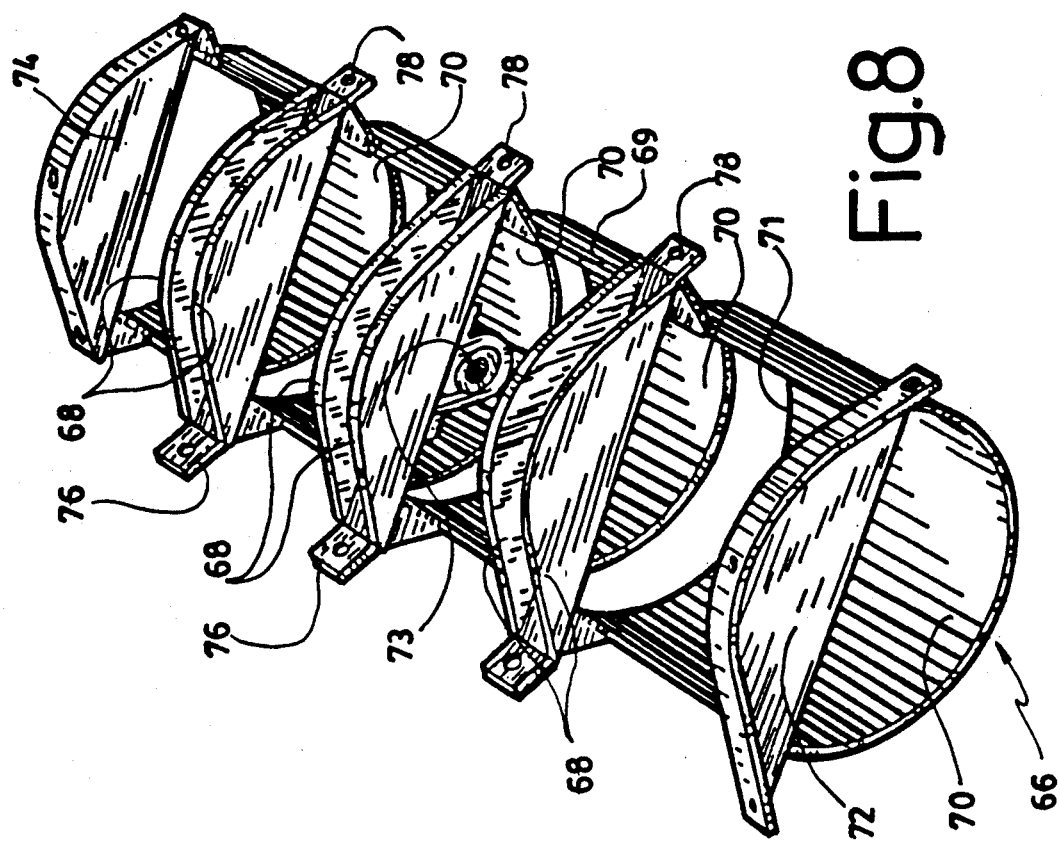
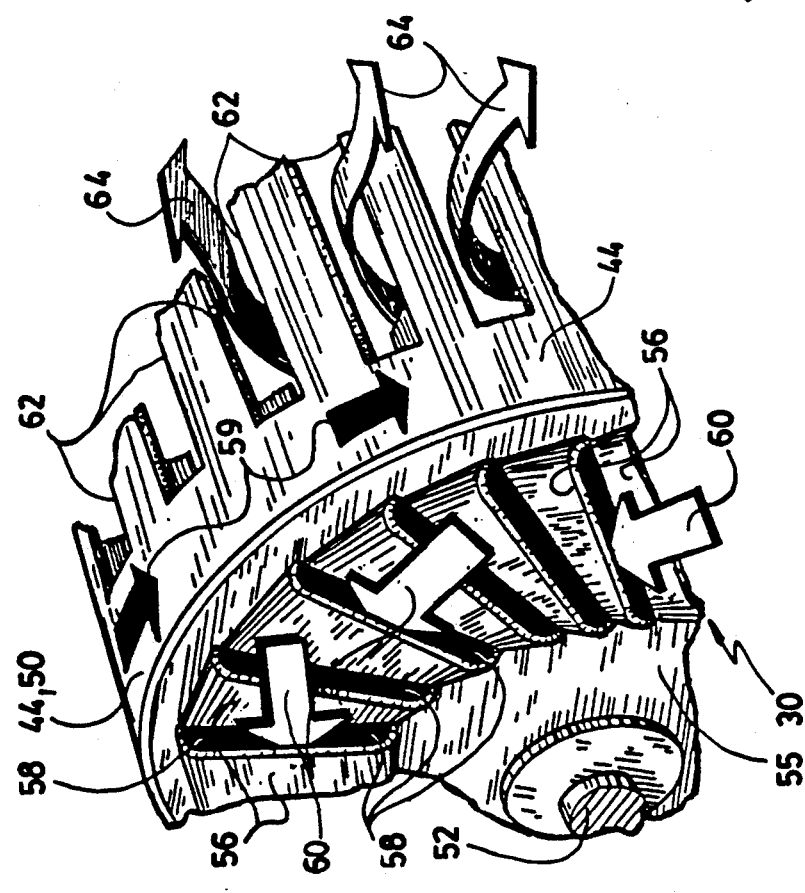

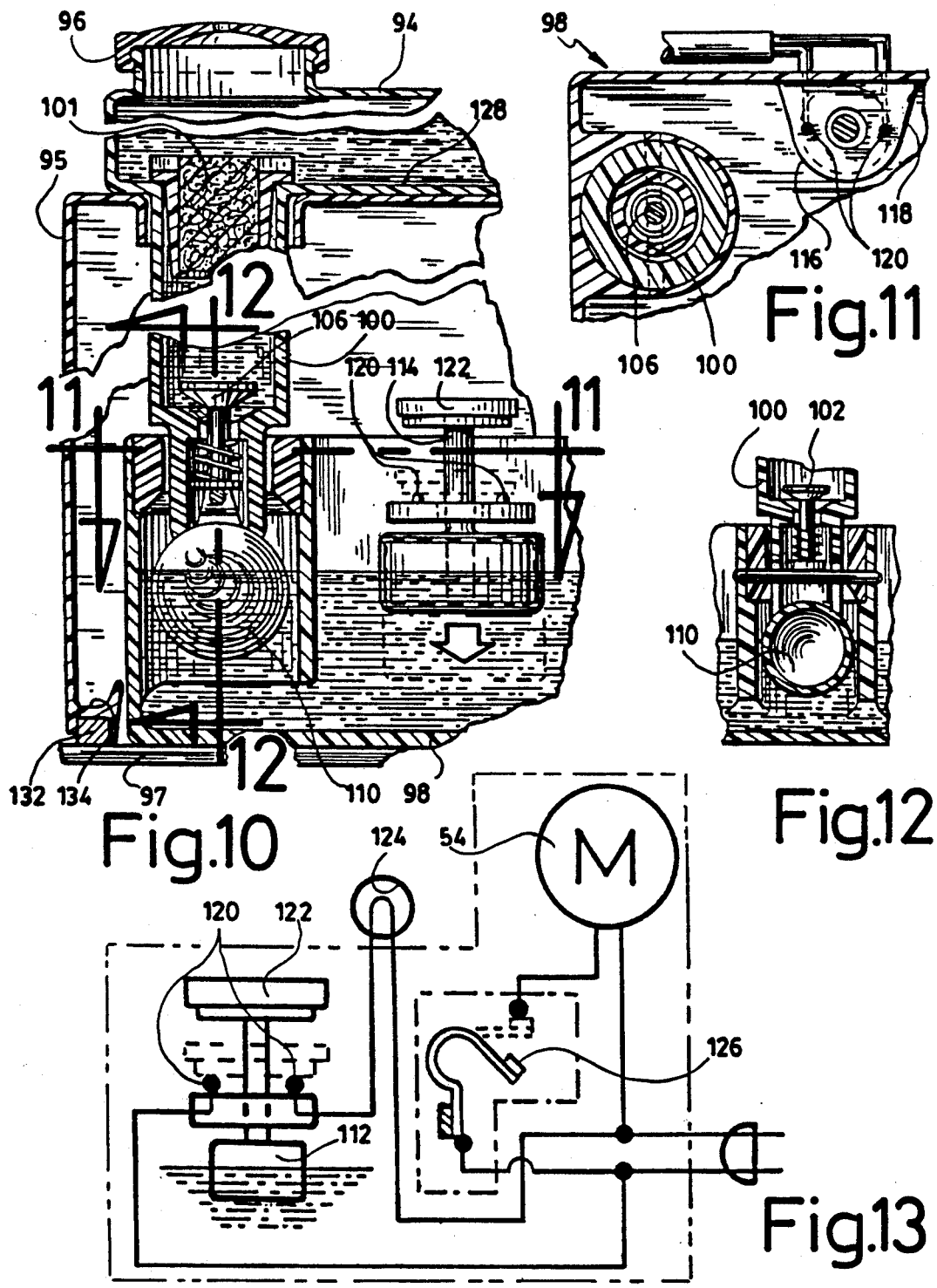

VENTILATING DEVICE FOR BASEBOARD HEATER

FIELD OF THE INVENTION

The present invention is directed to a ventilating device adapted to be installed over a baseboard heater having a heated air exit along and adjacent its upper face. The present invention is also directed to an improved blower fan.

BACKGROUND OF THE INVENTION

A search of the prior art has revealed that all the ventilating arrangements for electric baseboard heaters include built-in circulating fan units. U.S. Pat. No. 2,775,432, includes a blower located below the heating fins; a similar location of the blower relative to the heating unit is disclosed in Canadian Patents Nos. 741,430, 969,4590, and 1,147,789.

U.S. Pat. No. 1,949,993 describes a heating unit which integrally combines blowers located above heating fins. The blower is not removably mounted above the fins and does not pick up the heated air from a forward slot housing the fins. The blower is located inside the housing of the heater.

In Canadian Patent No. 772,260, a door is located at one end of a baseboard heater and is connected to a duct extending over an electric heater in order to accelerate the circulation of heated air laterally across the baseboard heater. R. W. Kritzer described in his U.S. Pat. No. 2,903,245, a baseboard radiator including propeller wheels located above a heating pipe. The blower as well as the pipes are all located within the same casing. The blower does not pick up the heated air from a front slot of the casing.

U.S. Pat. No. 4,754,697 of Jul. 5, 1988 entitled "Portable Fan device for forced air heating" describes a casing housing an electric fan and adapted to be placed on a forced air only the hot air emanating therefrom and not the ambient air.

OBJECTS OF THE INVENTION

The main object of the present invention resides in the provision of a ventilating device which includes a housing particularly designed to pick up only the heated air from the baseboard heater along a marginal slot forwardly located at the lower end of the housing, the device being provided with practically noiseless blower fans adapted to project the heated air coming from the marginal slot through apertures located in the upper forward portion of the housing.

SUMMARY OF THE INVENTION

The invention is directed to a self-contained ventilating device for a baseboard heaters and adapted to be mounted on the top of the latter. The new device is particularly adapted for baseboard heater having a substantially flat, horizontal, top panel and a longitudinal slot forwardly located adjacent the top panel through which heated air exits.

The device comprises a housing adapted to removably sit on the top panel of the heater. Said housing, which contains a blower fan, has a front wall adapted to exceed forwardly and upwardly the top of the front panel where the heated air exits. The housing displays an intake marginal slot along and behind the lower edge of the front wall of the housing and is adapted to receive the heated air exiting from the baseboard heater. The lower edge of said front wall downwardly protrudes from the top panel of the heater and is preferably formed by a lip which is vertically adjustable. The housing has apertures in the upward portion of the front wall to project the heated air discharged by the blower fan. A motor is included for rotating the fan.

The blower fan is particularly made of cylindrical drums axially spaced along a common shaft and having end walls with inclined fan blades inducing penetration of the heated air into the drums upon rotation thereof. The drums also have peripheral slots for allowing the heated air to be projected out of the drums in the direction of the apertures in the housing. A shield assembly heated air in the desired directions. The invention also foresees the inclusion of a water reservoir for providing humidity and an air filter for picking up dust particles before the air is projected by the fan. It is within alternative embodiments of the invention to include means for detecting the level of water in the reservoir, means for stopping the flow of water if the reservoir is removed and also means for stopping the motor when the level of water in the reservoir is below a predetermined height.

BRIEF DESCRIPTION OF THE DRAWINGS

FIG. 1 is a perspective view of a ventilating device according to the invention mounted on an electric baseboard heater;

FIG. 2 is a schematic view of the air circulation in a room containing a ventilating device mounted on a baseboard heater according to the invention;

FIG. 3a is a cross-sectional view taken along line 3a—3a of FIG. 1;

FIG. 4 is a front view of the rear of the ventilating device taken along line 4—4 of FIG. 3;

FIG. 5 is an enlarged view of the encircled portion 5 in FIG. 3;

FIG. 6 is a cross-sectional view of the blower fans taken along line 6—6 of FIG. 3;

FIG. 6a is a partial cross-section of one blower fan on an enlarged scale;

FIG. 7 is a perspective view of a portion of a blower fan illustrating the circulation of air therethrough;

FIG. 8 is a perspective view of shields surrounding the blower fans;

FIG. 10 is a partial, exploded section taken along line 10—10 of FIG. 9;

FIG. 11 is a cross-sectional view taken along line 11—11 of FIG. 10;

FIG. 12 is a cross-sectional view taken along line 12—12 of FIG. 10; and

FIG. 13 is a schematic view of an electric circuit for controlling the motor of the ventilating device.

DETAILED DESCRIPTION OF THE INVENTION

Figure 3:
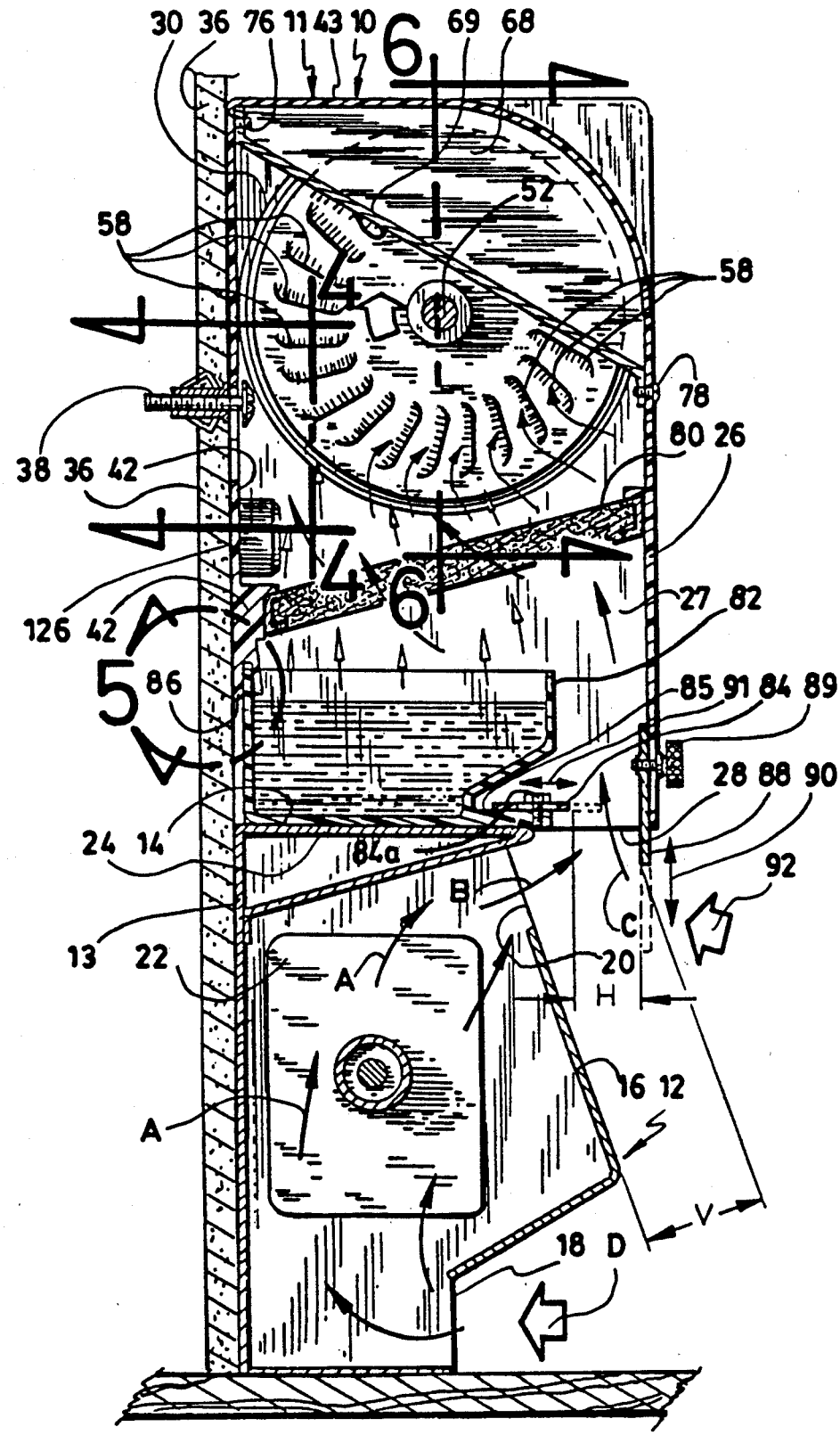
FIG. 3 is a cross-sectional view of the ventilating device and of a baseboard heater taken along line 3—3 of FIG. 1.

FIG. 1 illustrates a self-contained ventilating device 10 which is superposed over an electric baseboard heater 12. The baseboard heater 12 has a back panel 13 adapted to be fixed flat against a room wall 36, a top panel 14 which is substantially flat and horizontal and a front panel 16 (arrow D). The air circulates through the baseboard heater 12 by entering through a longitudinal slot 18 located along the bottom of the front panel 16 and exits through a marginal slot 20 extending between the top panel 14 and the front panel 16. The air which circulates along the arrows A (FIG. 3) passes between the heating fins 22 to project heated air through the upper slot 20.

The ventilating device includes an elongated housing 11 which is fully opened at the bottom and which has a back wall 42, a top wall 43, a front wall 26 and end walls 27. A water reservoir 82 has a bottom 24 which sits on the top panel 14 of heater 12. Reservoir 82 closes the bottom of housing but extends forwardly short of front wall 26 so as to define a marginal slot 28 adjacent the upper slot 20. The relative location of slots 20 and 28 allows the heated air circulating along arrow B to enter slot 28 and move upwardly considering that heated air has a tendency to raise. A blower fan 30 is mounted in the housing 11 to suck the air coming from the marginal sot 28 and to project it through the apertures 32 located at the upper front portion of the housing 11. Apertures 32 are elongated and extend in vertical planes through substantially a quarter of a circle in a curved wall portion formed at the junction of top and front panels 43 and 26. Housing 11 is shorter than heater 12 and the lower edges of its end walls 27 sit on top panel 14.

A schematic illustration of the flow of air is illustrated in FIG. 2 when the ventilating device 10 combined with the baseboard heater 12 is used. The arrows D show the general path of the cool air coming towards the baseboard 12. Heated air is projected upwardly and forwardly in the general direction of the arrows E. The speed of the incoming and outgoing air is much faster than the slow convection process generally illustrated by the concentric lines F originating from the baseboard heater 12. The thermostat 34 which is usually located on a wall away from the baseboard heater 12 will be exposed to the high temperature air much faster then without the ventilating device 10, and accordingly, will stopthe operation of the electric baseboard heater much faster and the heat in the room will be more evenly spread.

The retention of the housing 11 on wall 36 is obtained by means of screws such as 38 adapted to slide into a suitable aperture 40 located in teh back wall 42 of the housing 11.

The blower fan is constituted of a plurality of adjacently mounted drums 44, 46, 48 and 50 coaxially secured on an axle 52 driven by an electric motor 54. All the drums are similarly shaped, one of which is particularly partially illustrated in portion of which forms radially extending fan blades 56 all inclined in the same direction with respect to the planes of end walls 55 and separated by radial slots 58 opening in the direction of rotation of the drums 44 to induce air, shown by the arrows 60, to enter into the drums 44-50. The air pressure builds up inside the drums, and the air is forced out through the peripheral longitudinal slots 62 in the direction of the arrows 64. Slots 62 are made in the cylindrical wall of the drum, are elongated and extends parallel to axle 52.

Considering that the air must preferably enter the radial slots 58 while blades 56 are passing through the lower half of their rotation about axle 52 and must preferably exit through the peripheral slots 62 when the latter are passing through the upper half of their rotation about axle 52, a shielding arrangement is installed between teh drums and over part of the periphery of the rums. The shield member 66, illustrated in FIG. 8, includes pairs of spaced, parallel semi-circular partitions 68 located over the upper half of the end walls 55 and blades 56 of the drums so as to substantially prevent the air inside the drum to be expelled through the slots 58 located, during the rotation of the drum, in the upper half of the drum. Shield member 66 also includes peripheral shields 70 forming substantially semi-cylindrical portions which extend between the pairs of partitions 68 along the lower half of the drums; shield member further includes single partitions 72 and 74, having a semi-circular shape, which are disposed at each end of the series of drums 44-50. The shield member 66 is secured with screws to the housing 11 by the tabs 76 and 78. Each pair of partitions 68 is formed by a U-shaped member, the web 69 of which extends across the space between the adjacent end walls 55 of two drums and just above axle 52. The bottom half of said space communicates with inlet slot 28 through a registering aperture 71 formed between two adjacent shields 70. The centre web 69 carries a journal 73 for axle 52. The curved outer edges of partitions 68, 72, 74 conform with the surface of top wall 43 and of the curved junction of top wall 43 with front wall 26. Tabs 76,78 are extensions of webs 69.

In order to prevent the circulation of dust particles, an air filter 80 is disposed between the marginal slot 28 and the drums 44-50. The filter 80 is secured between the front wall 26 and the rear wall 42.

The ventilating device is provided with a water reservoir 82 located between the marginal slot 28 and the drums 44-50 and with its bottom 24 sitting on the top panel 14 of the baseboard heater.The heat from the baseboard heater 12 raises the temperature of the water in the reservoir 82 and the circulation of air over the surface of the water picks up humidity and raises the degree of humidity in the air passing through the blower fan 30.

The installation of the water reservoir 82 inside the housing 11 is made as follows. The reservoir 82 is a separate element of the ventilating device per se. After the reservoir 82 has been installed, the housing 11 is subsequently placed against the wall 36 and downwardly slid over the screws 38. A lower part 86 of the back wall 42 of housing is provided with a groove 87 adapted to grip the top edge of the rear wall of the reservoir 82 in proper position.

The effective width of marginal slot 28 is adapted to be modified by the addition of a horizontally adjustable baffle plate 84 and of a vertically adjustable lip or baffle plate 88 extending the entire length of air inlet slot 28. Baffle plate 84 is fixed by screws 84a to a forwardly protruding ledge 85 of reservoir 82. Screws 84a extend through elongated slots or baffle plate 84 and the latter is adjustably fixed in accordance with arrow 91 to adjust the effective width of inlet slot 28 as determined by distance H. Plate or lip 88 is slidingly fixed with screws 89 along the lower edge of the front face 26. The vertical adjustment of the lip 88, as shown in FIG. 3, along the arrow 90 prevents or at least substantially decreases entrance through slot 28 of ambient or room air which has not been previously heated and which would travel in accordance with arrows 92 and C. The degree of sliding of the lip 88 depends on the relative position of the front face 16 so as to leave a suitable distance V. Lip 88, which downwardly protrudes from top panel 24 of heater 12 is essential to prevent room air entrance and to fit various shapes of baseboard heaters 2.

Figure 9:
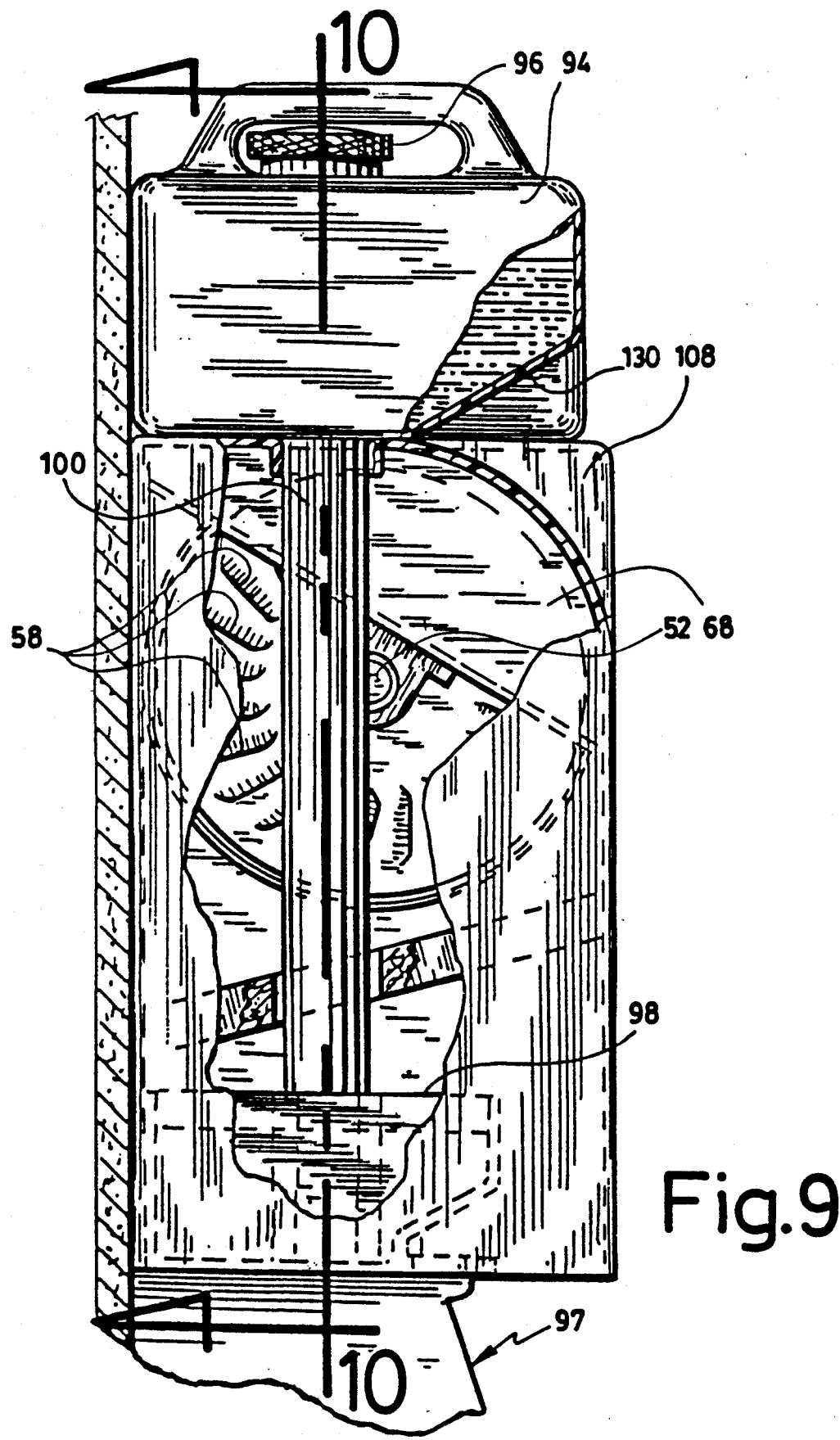
FIG. 9 is a side view with partly torn out portion of another embodiment of the ventilating device.

The water reservoir may be automatically supplied by a water container 94 as illustrated in FIG. 9. The container 94 may be removed from the top surface of the housing 95 of the ventilating device and filled at a water tap by removing the cover 96. The container 94 is hydraulically connected to the reservoir 98 shown in FIGS. 9 and 10 by a tubular member 100 fitted with filtering cartridge 101 to prevent occasional dirt from reaching the reservoir 98. A floating device is mounted at the lower end of the tubular member 100 to stop the flow of water when the container 94 is removed and pulled upwardly away from the reservoir 98. The lower end of the tubular member 100 has a tapered opening adapted to be closed by a correspondingly tapered valve 106 adapted to close the lower end of the tubular member 100 when the latter is pulled away from the reservoir 98. However, when the container 94 is sitting on the housing 108 and the water is within a predetermined level, the floating ball 110 raises the tapered valve 106 (FIG. 12) and provides a fluid communication between the container 94 and the reservoir 98. When the water level in reservoir 98 has reached a maximum level bal 110 abuts the lower end of tube 100 and stops water flow (FIG. 10).

The reservoir 98 is also provided with a floating member 112 having a cylindrical stem portion 114 adapted to slide through a fixed ring member 116. The ring member 116 is secured to a lateral surface 118 of the reservoir 98, the ring member 116 has on its upper surface a pair of metal tips 120 which are adapted to come in contact with a metal plate 122 at the top end of the stem portion 114 when the level of water is below a predetermined level in the reservoir 98. When the plate 122 contacts the metal tips 120, as shown in a schematic electrical circuit in FIG. 13, a signal light 124 lights up indicating that reservoir 98 is empty. Thermostat 126 (FIGS. 3 and 13) stops the fan motor 54 from operating the blower fans when the air circulated by fans is cold, that is when the baseboard heater has ceased to operate. Thermostat 126 starts motor 54 a few minutes after baseboard heater 12 has started to operate. In summer thermostat 126 starts motor 54 to circulate cool air coming at floor level.

The container 94 has a bottom face 128 which is upwardly slanted at 130 towards the front and above the apertures 32 (FIG. 1) so as to facilitate the free flow of air as generally shown by An alternative embodiment for holding the housing 95 on the op surface of the baseboard heater 97 (FIG. 10) consists of magnets 132 inserted in the lower edge 134 of the housing 95. Such retaining means is suitable when the housing of the baseboard heater is made of an iron-based metal.

The blower fan 30 of the invention is efficient and practically noiseless when operating, since most of the air turbulence is caused by the air propelling blades 56 which are located at the end walls of the drums 44-50 away from the air outlet apertures 32 of housing 11.

We claim:

1. A self-contained ventilating device for a baseboard heater having a back panel, a front panel, a substantially flat, horizontal, top panel and a rectilinear heated air exit along said front panel, adjacent to said top panel, said back panel fixed flat against a room wall, said device comprising an elongated housing having a back wall, a front wall, a top wall, end walls and opened at the bottom, means to fix said housing in an operative position with said back wall flat against said room wall and the bottom edges of said end walls sitting on said top panel, the distance between said back and front wall of said housing being greater than the distance between said back and front panels of said heater so that said front wall is located forwardly of said heated air exit when said device is in said operative position, said housing defining a marginal rectilinear slot along and behind said front wall, said front wall having a lower edge portion extending below said bottom edges of said end walls and therefore below said top panel of said heater in the operative position of said housing, said marginal slot receiving the heated air exiting from the front of said baseboard heater and said lower edge of said front wall preventing entrance of non-heated room air into said marginal slot in the operative position of said housing, said housing being provided with air exit apertures made in said top and front walls, a rotatable fan mounted in said housing for sucking air from said marginal slot and projecting it through said apertures, said blower fan including an electric motor, an axle drivingly connected to said electric motor and extending parallel to said top wall below the same and a plurality of spaced ventilating drums carried by said axle.

2. A ventilating device as defined in claim 1, wherein the lower edge portion of said front wall is formed by an elongated plate removably secured to said front wall in an adjusted vertical position so as to vary the vertical distance between the lower edge of said plate and the bottom edges of said end walls.

3. A ventilating device as defined in claim 1 further including a water reservoir removably located within said housing and adapted to sit over said top panel between said end walls whereby said heated air entering said marginal slot is adapted to pick up humidity from the surface of the water in said reservoir for circulation by said fan and further including a horizontally extending plate adjustably carried by said reservoir for adjustable horizontal movement across said marginal slot for adjusting the effective width of said slot.

4. A ventilating device as claimed in claim 1 wherein each drum includes a pair of end walls and a cylindrical wall, said end walls forming radially extending fan blades all inclined in the same direction with respect to the planes of said end walls and each separated by radially extending slots opening in the direction of rotation of the drum, said fan blades inducing air to enter within the drum such that air pressure is built up inside the drum, the cylindrical wall of said drum having apertures for the discharge of air from said drum.

5. A ventilating device as claimed in claim 4 further comprising a shield assembly for said drums, said shield assembly comprising pairs of spaced partitions extending between and close to the respective end walls of pairs of adjacent drums and masking the semi-circular upper portion of said drums for preventing heated air to exit through the radial slots in said end walls, and semi-cylindrical shield portions extending about the lower semi-cylindrical portion of each drum for preventing heated air from exiting through said apertures of said drums, said semi-cylindrical shield portions being spaced from each other to leave an opening in register with said pairs of partitions to allow entrance of heated air through said radial slots in the lower semi-circular portions of said end walls of said drums.

* * * * *